United States Patent [19]
O'Hara et al.
[11] Patent Number: 4,737,356
[45] Date of Patent: * Apr. 12, 1988

[54] IMMOBILIZATION OF LEAD AND CADMIUM IN SOLID RESIDUES FROM THE COMBUSTION OF REFUSE USING LIME AND PHOSPHATE

[75] Inventors: Mark J. O'Hara, Mt. Prospect; Marion R. Surgi, Evanston, both of Ill.

[73] Assignee: Wheelabrator Environmental Systems Inc., Hampton, N.H.

[ * ] Notice: The portion of the term of this patent subsequent to Feb. 9, 1999 has been disclaimed.

[21] Appl. No.: 935,899

[22] Filed: Nov. 28, 1986

Related U.S. Application Data

[63] Continuation-in-part of Ser. No. 799,236, Nov. 18, 1985, abandoned.

[51] Int. Cl.[4] .......................... F23J 1/00; E01C 19/26; C01G 11/00; C22B 1/243

[52] U.S. Cl. .................................... 423/659; 110/344; 75/25; 210/912; 210/901; 404/129; 423/92; 423/101

[58] Field of Search ............................... 252/626, 628; 204/DIG. 13; 423/92, 101, 659; 75/2, 24, 71, 25, 77; 106/117, 118; 210/901, 907, 908, 912; 110/344; 404/129

[56] References Cited

U.S. PATENT DOCUMENTS

| | | | |
|---|---|---|---|
| 3,676,165 | 7/1972 | Schneider-Arnoldi | 106/117 |
| 4,049,462 | 9/1977 | Cocazza | 106/118 |
| 4,113,504 | 9/1978 | Chen et al. | 252/628 |
| 4,124,405 | 11/1978 | Quienot | 210/912 |
| 4,354,876 | 10/1982 | Webster | 106/118 |
| 4,375,986 | 3/1983 | Pichat | 106/118 |
| 4,377,483 | 3/1983 | Yamashita et al. | 210/912 |
| 4,384,923 | 5/1983 | Hillekamp | 201/21 |
| 4,437,666 | 2/1984 | Frey et al. | 106/900 |
| 4,496,267 | 1/1985 | Gnaedinger | 106/118 |
| 4,671,882 | 6/1987 | Douglas et al. | 423/55 |

FOREIGN PATENT DOCUMENTS

| | | | |
|---|---|---|---|
| 34389 | 8/1981 | United Kingdom | 75/25 |

*Primary Examiner*—Gary P. Straub
*Attorney, Agent, or Firm*—Thomas K. McBride; John F. Spears, Jr.; Eugene I. Snyder

[57] ABSTRACT

Solid residues arising from the burning of solid wastes have lead and cadmium sufficiently insolubilized to pass the EPA toxicity test only where the pH in the EPA test is between 7.5 and 12.0. Addition of water soluble phosphate, especially phosphoric acid, increases the immobilization of lead and cadmium so as to make such residues in compliance with the toxicity tests over a substantially broader pH range.

17 Claims, 1 Drawing Sheet

Relationship Between pH, Bottom Ash: Fly Ash Ratio And FGSP: Fly Ash Ratio

| Symbol | % FGSP | % Fly Ash |
|---|---|---|
| ○—○ | 80 | 20 |
| □—□ | 67 | 33 |
| △—△ | 50 | 50 |
| ▽—▽ | 30 | 70 |

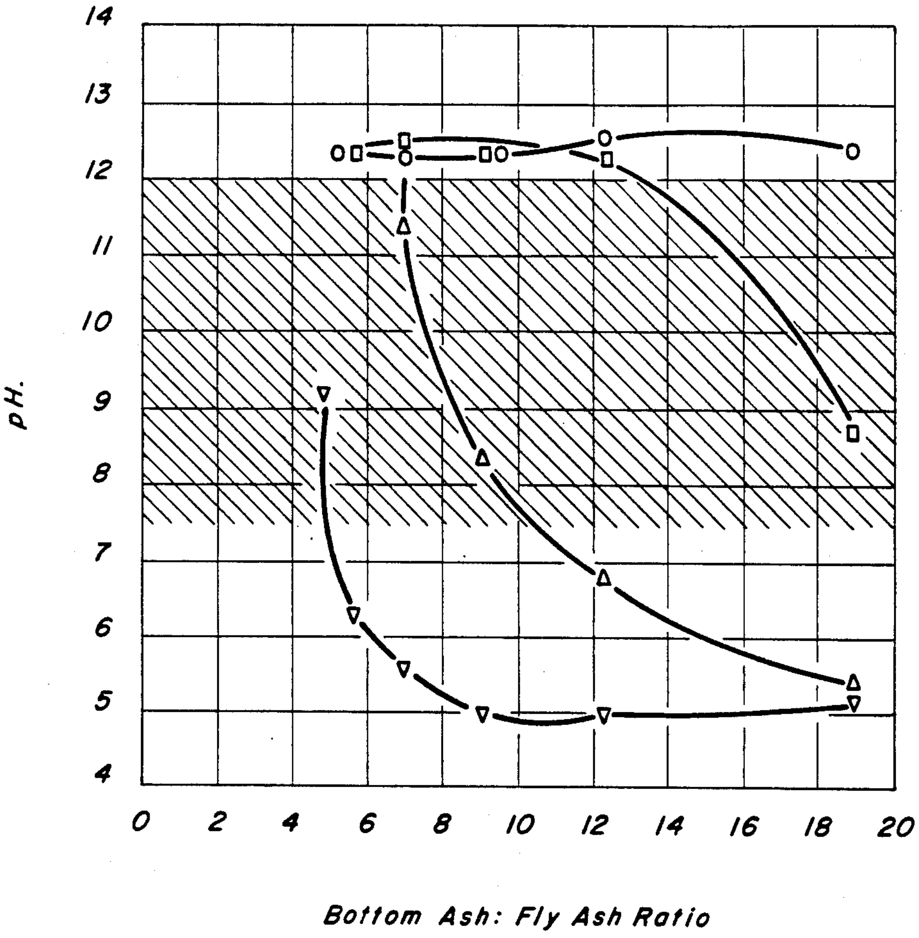
Relationship Between pH, Bottom Ash: Fly Ash Ratio
And FGSP: Fly Ash Ratio
| Symbol | % FGSP | % Fly Ash |
|---|---|---|
| ○—○ | 80 | 20 |
| □—□ | 67 | 33 |
| △—△ | 50 | 50 |
| ▽—▽ | 30 | 70 |

IMMOBILIZATION OF LEAD AND CADMIUM IN SOLID RESIDUES FROM THE COMBUSTION OF REFUSE USING LIME AND PHOSPHATE

CROSS REFERENCE TO RELATED APPLICATION

This application is a continuation-in-part of copending application Ser. No. 799,236 filed Nov. 18, 1985, now abandoned, all of which is incorporated by reference.

BACKGROUND OF THE INVENTION

An increasing world population leads to a continually increasing amount of refuse. Additionally, an increased level of civilization appears to generate an increased amount of refuse on a per capita basis. Both factors in combination lead to mounting pressure to devise methods of waste disposal which are economically, energetically, and environmentally sound.

In recent years, especially in urban areas, the increased demand for usable land and other concerns has caused one to turn from a landfill as the major mode of refuse disposal to other options, especially the use of raw refuse as an energy source. One variant of the latter is the mass burning approach, where all the refuse in its raw state is burned without any preliminary treatment such as separating the noncombustible from combustible material. Quite briefly, in this method raw garbage is dumped into storage where it is homogenized and dried to some degree. Refuse from the storage area is fed into a combustion zone where the heated gases often are used to generate steam. Flue gases then pass from the combustion zone to a separation zone, often an electrostatic precipitator, where dust and ash are removed. The ash so removed from the flue gas, called fly ash, is then mixed with the ash collected in the combustion zone, called bottom ash, and the combined ash used for landfill, in road construction, and so forth.

It is well known that some of the more volatile compounds of certain metals tend to accumulate in the fly ash. Especially where the latter is to be used as landfill, leaching of toxic metals, especially cadmium and lead, constitutes a potential hazard to the ecosystem, for example, both surface water supplies and aquifers. The Environmental Protection Agency (EPA) has promulgated a procedure to determine the toxicity of solid wastes, and where residues exceed the toxicity as stated in the Federal Register Code 40, No. 26124, the waste is classified as a hazardous waste requiring control under the Hazardous Waste Management System. A recent report prepared for the Office of Solid Waste, U.S. Environmental Protection Agency, which was a limited survey of several kinds of solid waste, seems to suggest that levels of cadmium and lead in fly ash pose perhaps the most serious environmental threat, and that such fly ash alone would need to be treated as a hazardous waste; EP Toxicity Test Results on Residues from Eight Resource Recovery Facilities, SYSTECH Corporation, February, 1981.

The environmental hazard of fly ash containing amounts of cadmium and lead greater than the toxic levels specified by the EPA is somewhat diminished by mixing such ash with heavy ash, such that the resulting landfill mixture is within the toxic levels for the cited metals. Nonetheless, it is highly desirable to reduce the amount of cadmium and lead leached from fly ash and other solid waste to an amount below the toxic levels specified by the EPA. The invention herein is a solution to this problem. More specifically it is a method of treating dry, solid residues, especially fly ash, and mixtures containing fly ash, so as to reduce the amounts of cadmium and lead leached from such residues to a level below the toxic level specified by the EPA. Stated differently, the invention herein is a method of immobilizing, or insolubilizing, cadmium and lead in solid waste, especially over a wide pH range. The method is convenient, quite simple, very efficient, applicable over a wide pH range, and relatively low cost. The method is, therefore, commercially extraordinarily attractive as well as being environmentally beneficial.

The problem we have addressed is not new; only our solution to this problem is new. Prior solutions have relied on transforming metal-laden ash into a solid, hardened, often brick-like consistency to immobilize lead and cadmium. Such solutions are based on producing a product largely impermeable to water, thereby reducing, if not eliminating, metal transport by diffusion. In contrast, our invention retains the powdery (particulate) nature of the ash-containing residues while immobilizing lead and cadmium; the treated residue remains a particulate, non-hardened solid which does not harden to a brick-like consistency and this characteristic serves as a distinguishing feature of our invention.

The precipitation of heavy metals, including cadmium and lead, at high pH is a well-known analytical technique, and the use of lime as the basic agent is a common procedure. For example, solid wastes containing cadmium and lead were treated with 3–15% calcium hydroxide and/or magnesium sulfate, the pH was adjusted to 8–10.5, and the solid coated with asphalt to prevent the leaching of cadmium and lead. Chemical Abstracts, 92; 185414d. The preceding method is a mixture of coagulation-flocculation followed by encapsulation in a hydrophobic, petroleum-based solid.

In U.S. Pat. No. 4,049,462 Cocozzo treated industrial desulfurization residues resulting from removal of sulfur oxides from effluent gas with alkaline calcination stack dust and water under acidic conditions to form a solid, hardened, leach-resistant product. The patentee recognized that the cement-like product resulted from the reaction of calcium oxide and silicate in the stack dust with acid anions, whose nature was not significant so long as the mass reacted under acidic conditions to provide a hardenable mass which upon drying became cementitious solid.

Pichat describes a process to transform strongly acidic liquid wastes containing relatively high metals content, including cadmium, into solid materials by mixing the wastes with coal fly ash, adjusting the pH to about 7, adding a lime-containing substance and a binder, such as Portland cement, with the mixture setting to a petrified mass; U.S. Pat. No. 4,375,986. As the patentee recognized, coal ash is pozzolanic, i.e., in the presence of lime it agglomerates into a hard, compact, mortar type product. Clearly, Pichat's invention describes a method to treat acidic liquid wastes and uses coal fly ash as an additive. The patentee also recognizes that coal fly ash does not contain sufficient amounts of Pb and Cd to present an environmental concern. Although Schneider-Arnoldi et al. in U.S. Pat. No. 3,676,165 teach that phosphorous furnace slag can be substituted for lime as a binder, and that such slag contains phosphorous compounds in the amount of 0.5–2.0% reported as $P_2O_5$, the slag is a hard vitreous mass which fails to furnish soluble phosphate, an essential element of our invention. In fact, such slag contains phosphorous chiefly as calcium phosphate, which we show to be inoperative in immobilizing lead and cadmium.

In all instances reported in which a cement-like material is fabricated from fly ash, the inventors use coal fly ash which due to chemical composition, surface composition and morphology, and size distribution is pozzolanic. However, for these same reasons, incinerator fly ash is not pozzolanic and cannot form a stable cement in the absence of ordinary portland cement. The invention described here does not require ordinary portland cement and neither requires nor utilizes solidification or agglomeration for its successful application. Methods applicable to agglomeration or fixation of coal fly ashes are simply not readily applicable to incinerator fly ashes.

A base course for pavement construction can be made from incinerator ash reacted with lime and water prior to compaction; U.S. Pat. No. 4,496,267, European Pat. No. 34-389, directed toward the agglomeration of coal fly ash into pellets, discloses some phosphorous compounds in the ash and reports the total phosphorous content as $P_2O_5$, but as with Schneider-Arnoldi et al. this phosphorous source does not furnish soluble phosphates.

We have discovered a method of immobilizing lead and cadmium in refuse-to-energy combustion residues effective over a broad pH range to reduce the leaching of the aforementioned heavy metals to a level below the maximum dictated by the EPA. Quite simply, the method involves treatment of the solid residues with lime followed by addition of a water soluble phosphate. Using this method levels of lead and cadmium are reduced to less than 5 and 1 ppm, respectively. It is also desirable to immobilize the toxic metals to pass the regulatory limits with a typical acid rain or water extraction. This requires an immobilization system which is effective over the entire pH range above about 5.0; the method we have discovered meets this requirement. Our method does not change the particulate nature of the untreated solid residue; it generates no cement-like mass. Our method does not generate calcium phosphate as the metal binder; substitution of calcium phosphate for our soluble phosphate fails to immobilize lead and cadmium. Whatever may be the detailed mechanism of metals immobilization in our method, it appears that our immobilizing materials of lime and soluble phosphate remain quiescent and inactive in the dry solid residue, but when water—the extractant—perfuses through the solid the immobilizers raise a barrier to dissolution and/or diffusion of the metals into the liquid phase.

SUMMARY OF THE INVENTION

The purpose of this invention is to increase the immobilization of lead and cadmium in solid residues from combustion plants. In one embodiment fly ash is treated with lime, mixed with bottom ash, and the resulting mixture treated with a source of water soluble phosphate. In a more specific embodiment the lime originates from flue gas scrubber product. In a still more specific embodiment the water soluble phosphate is added in an amount from about 1% to about 8% by weight of the ash-lime mixture. Other embodiments will become apparent from the following description.

DESCRIPTION OF THE FIGURE

The figure shows the final pH of the extract in an EPA test of various solid residues from the burning of solid wastes. The cross-hatched part represents the sole region where the EPA Toxicity limits for both lead and cadmium are met in the residues.

THE PROBLEM

Flue gas resulting from the combustion of refuse often is passed through lime to remove such materials as hydrogen chloride, sulfur dioxide, sulfuric acid, carbon dioxide, nitrogen oxide, and other acidic compounds normally found in flue gas to afford a solid called flue gas scrubber product. Fly ash also frequently is mixed with lime, in part to immobilize (insolubilize) heavy metals found therein, including lead and cadmium. Where flue gas scrubber product is available it is used either as the sole source of lime or as lime make-up for treatment of the fly ash. The fly ash-lime/flue gas scrubber product mixture is then admixed with bottom ash for uses as mentioned above. However, the ratio of bottom ash to fly ash varies considerably, as does the ratio of flue gas scrubber product to fly ash and the extent to which the lime is neutralized in flue gas scrubber product, according to the source of refuse, the operational characteristics of the plant, and so forth. The resulting mixture containing flue gas scrubber product, fly ash, and bottom ash has an alkalinity which can vary considerably and additionally displays a broadly varying buffering power. As the data of Example 1 show, such mixtures often fail the EPA test for lead and/or cadmium, essentially because cadmium precipitates at a pH greater than about 7.5 but lead, being amphoteric, begins to redissolve at a pH greater than about 12. Consequently, only in those mixtures whose final pH after extraction in the EPA test (vide infra) is between about 7.5 and about 12.0 are lead and cadmium immobilized sufficiently well for the mixture to be within the stated regulatory limits.

The practical aspects of refuse burning dictate a broad range of flue gas scrubber product-fly ash-bottom ash solid waste mixtures with an accompanying range of alkalinity. The regulatory aspects of solid wastes dictate that leaching of lead be limited to less than 5 ppm and leaching of cadmium to be no more than 1 ppm. The technical aspects of the aforementioned solid waste mixtures demonstrate an enormous variation in the leaching of lead and cadmium depending upon pH. The problem, simply stated, is to make the practical, regulatory, and technical aspects compatible. That is, what can be done to immobilize lead and cadmium in the broad range of solid waste mixtures of flue gas scrubber product-fly ash-bottom ash normally produced in refuse burning plants so as to conform to EPA regulations?

THE SOLUTION

The solution, simply stated, is to add water soluble phosphate. Stated somewhat more extensively, we have discovered that addition of water soluble phosphate to flue gas scrubber product-fly ash-bottom ash solid waste residues of a broad compositional range insolubilizes lead and cadmium to an extent as to make the residue in total compliance with EPA regulations, notwithstanding a broad variation in alkalinity of such residues. The solution is remarkable in that it cures a vexing problem with an extraordinarily simple treatment. The remainder of this exposition is devoted to a more complete description of our invention.

Even more generally, our invention takes a particulate (powdery or granular) dry solid residue arising from the burning of solid waste in a mass burning plant, and from which lead and cadmium are leached at levels of more than 5 and 1 ppm, resp., and treats the residue with lime, especially that arising from a flue gas scrubber product of a mass burning plant, and one or more water soluble phosphates, to obtain a particulate residue which maintains its particulate nature but from which leaching of the aforementioned is below the stated levels.

DESCRIPTION OF THE INVENTION

The solids being treated in our invention are residues resulting from the burning of solid wastes, generally in commercial mass burning facilities, and from which cadmium and/or lead are leached at levels in excess of 1 and 5 ppm, resp., as determined by an EPA test. Initially such solids are a free flowing particulate mass, and a virtue of our invention is that after treatment to immobilize lead and cadmium the solids remain a free flowing particulate mass, even after water percolation, and maintain this characteristic. The solids treated generally are fly ash, in whole or in part, since lead and cadmium tend to be concentrated in the fly ash. In one variant of our invention the solid residue treated is a mixture of fly ash and bottom ash, usually containing between about 2 and 25% by weight of fly ash, even more often between 5 and 20% fly ash. The following description of our invention is couched in terms of the fly ash first being treated with lime or a lime source, with this mixture subsequently being combined with bottom ash prior to addition of a water soluble phosphate. This corresponds to the most convenient way of carrying out our invention, but the choice of this particular description is for expository convenience only. It is to be clearly understood that variants such as treatment of fly ash alone with lime and phosphate prior to mixing with bottom ash, or treating a mixture of fly and bottom ash with lime and phosphate, are intended to be subsumed under our invention as claimed, as are other permutations which one skilled in the art will recognize.

Using fly ash as an example of the solid residue to be treated, the fly ash is mixed with lime. By lime we mean calcium oxide (dry lime), calcium hydroxide (hydrated lime), a lime source or any mixture thereof. Where flue gas is scrubbed with lime, the flue gas scrubber product (FGSP) may be either the sole source of lime or may be used only in part as the lime source. In addition to containing calcium hydroxide, the FGSP typically will contain such materials as calcium sulfate, calcium sulfite, calcium chloride, and calcium carbonate. The percentage of calcium hydroxide in the FGSP is itself subject to broad variation, and the amount of FGSP used will depend in part on the amount of calcium hydroxide present. In the successful practice of this invention, lime or FGSP will be added to fly ash in an amount from 1 to about 25 parts by weight of lime, based on its calcium hydroxide content, per 5 parts by weight of fly ash.

The fly ash-lime mixture is then mixed with bottom ash in the normal, commercial practice of this invention. The relative amounts of these two components often is expressed as a ratio of bottom ash to fly ash, and normally varies from perhaps 3:1 to 49:1, i.e., the mixture contains from about 2 to about 25% by weight fly ash, most often being in the range of 5–20% by weight fly ash. The lime-fly ash-bottom ash mixture is then treated with a source of water soluble phosphate to complete the immobilization of lead and cadmium. It is, perhaps, most convenient merely to spray the mixture with the phosphate source and then agitate the mixture to ensure the dispersion of phosphate. However, merely dispersing a good source of water soluble phosphate through the mixture also may be performed, although not necessarily with equivalent results.

Any convenient source of water soluble phosphate may be used in the practice of this invention. By a water soluble phosphate is meant a phosphate soluble in water at about 20° C. at least to the extent of about five weight-volume percent. Phosphoric acids, including orthophosphoric acid, hypophosphoric acid, metaphosphoric acid and pyrophosphoric acid, can be conveniently used in this invention. Sometimes it is desirable to use a less acidic source of phosphate, and in fact it is essential that the phosphate source and use level be such that a substantial part of the lime is not neutralized. Other less acidic sources of phosphates include phosphate, monohydrogen phosphate, and dihydrogen phosphate salts, such as trisodium phosphate, disodium hydrogen phosphate, sodium dihydrogen phosphate, potassium phosphate, dipotassium hydrogen phosphate, potassium dihydrogen phosphate, lithium phosphate, lithium hydrogen phosphate, and lithium dihydrogen phosphate. Quite generally, the salts of the various phosphoric acids may be utilized, and among these the alkali metal salts are most frequently employed.

The amount of water soluble phosphate source to be added to the solid residue to ensure adequate immobilization of lead and cadmium will depend on such variables as alkalinity of the solid residue, its buffering capability, the amount of lead and cadmium initially present, and so on. It has been found generally that an amount of the water soluble phosphate source equivalent to between about 1% and about 8% by weight of phosphoric acid, $H_3PO_4$, based on total solid residue is sufficient, but is not intended to preclude yet higher usage of an water soluble phosphate if needed.

The examples below are merely illustrative of this invention and are not intended to limit it thereby in any way.

The following procedure, based on an EPA method as described in the Federal Register V. 45, No. 98, May 19, 1980, pp 33099 et ff., was used to screen various methods. The EPA test was modified only as to scale, i.e., the test used by us was a scaled-down version of the standard EPA procedure. Experiments were performed by mixing an immobilizing material with 10 g dry fly ash in a 500 ml Erlenmeyer flask. Water (160 ml) was added and the mixture was agitated thoroughly on a wrist action shaker. After one hour the pH was recorded and adjusted to 5.0+0.2 by addition of 0.5N acetic acid. Agitation was continued with hourly adjustment of pH to 5.0+0.2 until a stable pH of 5.0 was reached or the maximum allowed amount (40 ml) of 0.5N acetic acid was used. The total mixing time on the standard test was 24 hours. Solids were separated on a vacuum Millipore filter XX1004700 using an AP type prefilter and an HA type 0.45 micron fine filter. If less than 40 ml acetic acid was used, the final volume was adjusted with water in an amount determined by the following equation:

$$V=(20)(W)-16(W)-A$$

where:

V = ml distilled water to be added.

W = weight in g of solid charged to extractor

A = ml of 0.5N acetic acid added during extraction

Ultrapure concentrated nitric acid in an amount of 1 ml per 100 ml leachate was added after filtration to stabilize the solution. The modified EPA toxicity reference test itself is carried out without the addition of immobilizing material. Levels of cadmium and lead in leachate were determined by atomic absorption spectroscopy.

The bottom ash-fly ash mixtures used in our studies contained about 0.5 weight percent phosphorous, which is equivalent to 1.1% reported as $P_2O_5$. This shows that the phosphorous-containing materials present in the ash residue is not a source of soluble phosphate necessary for immobilization.

EXAMPLE 1

Solid residues exemplifying a broad spectrum of flue gas scrubber product-fly ash-bottom ash compositions were tested for lead and cadmium content using the EPA test as described above. The FGSP typically had a calcium hydroxide content between 40% and 60%. The final pH after extraction in the EPA test is plotted for various compositions in the figure. It was observed that the EPA limits for Pb were met only within the pH range 6.7–12.0, and the EPA limits for Cd were met only at a pH above 7.5. As can be seen from that figure, only a limited number of such compositions afforded a final pH between 7.5 and 12.0, the range within which the EPA test for both lead and cadmium are met.

EXAMPLE 2

Solid residues were prepared using a ratio of bottom ash to fly ash of 19:1. To this was added flue gas scrubber product containing about 57% free calcium hydroxide in different weight ratios. The EP toxicity test was then run on this mixture of FGSP-fly ash-bottom ash as well as one containing 4.25% phosphoric acid. The results are tabulated below.

TABLE 1

Effect of 4.25% $H_3PO_4$ in Modified EP Toxicity Test

| | | | | | | |
|---|---|---|---|---|---|---|
| FGSP:Fly Ash | 4:1 | 4:1 | 1:1 | 1:1 | 3:7 | 3:7 |
| % $H_3PO_4$ | 0 | 4.25 | 0 | 4.25 | 0 | 4.25 |
| EP Toxicity Test | | | | | | |
| Initial pH | 12.62 | 12.24 | — | 7.40 | 12.46 | 5.43 |
| Final pH | 12.38 | 10.21 | 5.38 | 5.05 | 4.99 | 5.11 |
| Extract mg/L | | | | | | |
| Pb | 5.6 | 0.1 | 11.8 | 0.23 | 8.46 | 0.1 |
| Cd | 0.014 | 0.01 | 1.27 | 0.45 | 1.33 | 0.29 |

As can be seen, the EPA test limits for lead and cadmium are met over the pH range from 5.05 to 10.2, whereas in the absence of phosphate acceptable limits of leaching were not met.

EXAMPLE 3

In this example solid residues of varying bottom ash:-fly ash and FGSP:fly ash ratios were subjected to the EP toxicity test with and without the addition of 4.25% phosphoric acid. The following table again demonstrates the efficacy of phosphoric acid in immobilizing both lead and cadmium over the quite broad pH range from 5.2 to 12.6.

TABLE 2

Effect of 4.25% $H_3PO_4$ With Various Bottom Ash:Fly Ash and FGSP:Fly Ash Ratios

| | | | | | | | | |
|---|---|---|---|---|---|---|---|---|
| Bottom Ash:Fly Ash | 7:1 | 7:1 | 7:1 | 7:1 | 9:7 | 9:7 | 4:1 | 4:1 |
| FGSP:Fly Ash | 4:1 | 4:1 | 3:7 | 3:7 | 2:1 | 2:1 | 1:1 | 1:1 |
| % $H_3PO_4$ | — | 4.25 | — | 4.25 | — | 4.25 | — | 4.25 |
| EP Toxicity Test | | | | | | | | |
| Initial pH | 12.63 | 12.60 | — | 7.07 | 12.60 | 12.67 | 12.60 | 12.68 |
| Final pH | 12.43 | 12.60 | 5.60 | 5.18 | 12.43 | 10.19 | 12.60 | 11.00 |
| Extract mg/L | | | | | | | | |
| Pb | 17.0 | 1.2 | 12.0 | 0.31 | 13.5 | 0.062 | 14.0 | 0.063 |
| Cd | 0.090 | 0.01 | 2.82 | 0.70 | 0.01 | 0.01 | 0.01 | 0.01 |

EXAMPLE 4

In this example an ash composite was extracted with synthetic acid rain. A blend of nitrates, sulfates, and chlorides was made to simulate acid rain representative of the Northeastern U.S. The following compounds were dissolved in a total solution of four liters to prepare an acid rain concentrate.

| Compound | g |
|---|---|
| $NaNO_3$ | 0.1150 |
| $KNO_3$ | 0.2196 |
| $NH_4NO_3$ | 0.0648 |
| $MgCl_2$ | 0.0821 |
| $H_2SO_4$ | 0.1755 |
| $CaSO_4$ | 0.1057 |

The pH of the concentrated solution was 2.88. A solution was prepared for use in the acid rain extraction tests by diluting this mixture by a factor of 10; the resulting pH was 3.93. This dilute solution, which should be representative of a typical acid rain, was used as a replacement for 0.5N acetic acid to test blends of FGSP, fly ash, and bottom ash. Otherwise, the extraction was identical to the EP Toxicity Test. As the data of Table 3 demonstrate phosphoric acid addition again was quite effective in reducing the levels of lead leached from such a composite.

TABLE 3

Acid Rain. Extraction of Ash Composite; Effect of 4.2% $H_3PO_4$

| | | | | | | |
|---|---|---|---|---|---|---|
| FGSP:Fly Ash | 1:1 | 1:1 | 4:1 | 4:1 | 3:7 | 3:7 |
| % $H_3PO_4$ | — | 4.25 | — | 4.25 | — | 4.25 |
| Acid Rain Extraction | | | | | | |
| Initial pH | 12.58 | 8.10 | 12.70 | 12.67 | 12.54 | 5.47 |
| Final pH | 12.66 | 7.29 | 12.73 | 12.78 | 12.50 | 5.79 |
| Extract mg/L | | | | | | |
| Pb | 2.8 | 0.1 | 3.5 | 0.71 | 1.5 | 0.1 |
| Cd | 0.01 | 0.01 | 0.01 | 0.01 | 0.01 | 0.063 |

EXAMPLE 5

Various ash composites were extracted with water alone to determine the effect of added phosphate on heavy metal leaching. The experiments were performed in a 500 ml Erlenmeyer flask with 10 g of a FGSP:fly ash blend and 200 ml $H_2O$ with agitation by a wrist action shaker for 24 hours.

TABLE 4

| $H_2O$ Extraction of Ash Composite: Effect of 4.2% $H_3PO_4$ | | | | | | |
|---|---|---|---|---|---|---|
| FGSP:Fly Ash | 1:1 | 1:1 | 2:1 | 2:1 | 4:1 | 4:1 |
| % $H_3PO_4$ | 0 | 4.25 | 0 | 4.25 | 0 | 4.25 |
| $H_2O$ Extraction test | | | | | | |
| Initial pH | 12.42 | 7.30 | 12.60 | 11.88 | 12.61 | 12.51 |
| Final pH | 12.70 | 8.07 | 12.66 | 10.48 | 12.67 | 12.57 |
| Extract mg/L | | | | | | |
| Pb | 14.9 | 0.1 | 6.5 | 0.19 | 5.8 | 0.93 |
| Cd | 0.01 | 0.01 | 0.01 | 0.02 | 0.01 | 0.01 |

As in the prior examples, addition of phosphoric acid substantially reduces the amount of lead leached under the conditions of this test.

EXAMPLE 6

Composites containing a 19:1 ratio of bottom ash:fly ash were tested with either phosphoric acid or disodium hydrogen phosphate, $Na_2HPO_4$ as the source of water soluble phosphate. In both cases the solid residue easily met the EPA toxicity test.

TABLE 5

| Comparison of $H_3PO_4$ With $Na_2HPO_4$ Modified EP Test | | | | | | |
|---|---|---|---|---|---|---|
| FGSP:Fly Ash | 4:1 | 4:1 | 1:1 | 1:1 | 3:7 | 3:7 |
| % $H_3PO_4$ | 4.25 | — | 4.25 | — | 4.25 | — |
| % $Na_2HPO_4$ | — | 5.0 | — | 5.0 | — | 5.0 |
| EP Toxicity Test | | | | | | |
| Initial pH | 12.70 | 12.69 | 6.27 | 12.30 | 5.50 | 11.88 |
| Final pH | 6.50 | 11.62 | 5.11 | 5.18 | 5.07 | 5.10 |
| Extract mg/L | | | | | | |
| Pb | 0.1 | 0.075 | 0.1 | 0.24 | 0.1 | 0.15 |
| Cd | 0.036 | 0.015 | 0.34 | 0.33 | 0.19 | 0.50 |

EXAMPLE 7

A composite containing a ratio of bottom ash:fly ash of 19:1 with varying ratios of FGSP:fly ash were tested using from 1% to 4.25% phosphoric acid. As can be seen, even 1% phosphoric acid was generally effective in reducing leaching of lead and cadmium to an acceptable level except with a FGSP:fly ash ratio of 1:1.

TABLE 6

Effect of $H_3PO_4$ Content
Immobilization of Pb and Cd in FGSP:Fly Ash:Bottom Ash Blends
9.5 g Bottom Ash + 0.5 g Fly Ash

| FGSP:Fly Ash | 4:1 | 4:1 | 4:1 | 4:1 | 1:1 | 1:1 | 1:1 | 1:1 | 3:7 | 3:7 | 3:7 | 3:7 |
|---|---|---|---|---|---|---|---|---|---|---|---|---|
| % $H_3PO_4$ | 0 | 4.25 | 2.1 | 1.0 | 0 | 4.25 | 2.1 | 1.0 | 0 | 4.25 | 2.1 | 1.0 |
| EP Toxicity Test | | | | | | | | | | | | |
| Initial pH | 12.62 | 12.24 | 12.60 | 12.64 | — | 7.40 | 12.25 | 12.42 | 12.46 | 5.43 | 7.03 | 12.04 |
| Final pH | 12.38 | 10.21 | 12.45 | 12.24 | 5.38 | 5.05 | 5.14 | 5.08 | 4.99 | 5.11 | 5.16 | 5.11 |
| Extract mL/g | | | | | | | | | | | | |
| Pb | 5.6 | 0.1 | 0.46 | 0.36 | 11.8 | 0.23 | 0.1 | 0.49 | 8.46 | 0.1 | 0.1 | 0.38 |
| Cd | 0.014 | 0.01 | 0.01 | 0.01 | 1.27 | 0.45 | 0.51 | 1.2 | 1.33 | 0.29 | 0.24 | 0.83 |

EXAMPLE 8

The following study was performed to show that the initial leaching results in the EPA test were not merely temporary, and that the lead and cadmium in the treated material remained immobilized. A mixture of fly ash and flue gas scrubber product (Ca. 30:70) was sprayed with water containing a variety of phosphates to afford a mixture with 20% moisture and containing various levels of phosphates, reported as weight percent phosphorous. (A level of 2.6 weight percent phosphorous is equivalent to 8.0 weight percent phosphate as phosphoric acid.) This mixture was aged in a closed bottle and subjected to the EPA leach test at intervals for lead and cadmium. In all cases the leachate contained <0.01 ppm cadmium. Results are reported in Table 7.

TABLE 7

Stability of Immobilization

| Phosphate | | Lead in Leachate | |
|---|---|---|---|
| Level[a] | Source | Day | Level |
| none | | 0 | 44 |
| 2.6 | $Na_2HPO_4$ | 0 | 3.6 |
| | | 4 | 3.1 |
| | | 7 | 3.0 |
| | | 28 | 2.1 |
| | 85% $H_3PO_4$ | 0 | 3.9 |
| | | 4 | 2.7 |
| | $Na_4P_2O_7.10\ H_2O$ | 0 | 6.0 |
| | | 5 | 3.2 |
| | $Na_4P_2O_7.10\ H_2O$[b] | 0 | 6.5 |
| | | 5 | 5.1 |
| | $Na_5P_3O_{10}$[b] | 0 | 6.8 |
| | | 3 | 5.3 |
| 2.0 | $(NaPO_3)_6$ | 0 | 7.2 |
| | | 5 | 7.5 |
| | $NaH_2PO_4.2\ H_2O$ | 0 | 5.7 |
| | | 5 | 5.5 |
| | $Na_5P_3O_{10}$ | 0 | 4.5 |
| | | 5 | 4.7 |
| | $Na_2HPO_4$ | 0 | 7.9 |
| | | 4 | 6.5 |
| | $Na_5P_3O_{10}$—85% $H_3PO_4$ (1:1) | 0 | 4.4 |
| | | 5 | 6.4 |

[a]in wt. %
[b]added as solid, water subsequently sprayed on to 20% moisture level.

EXAMPLE 9

A 19:1 bottom ash-fly ash composition was mixed with an equal amount of flue gas scrubber product and treated with various acids and the anions of these acids. The data in Table 8 shows unequivocally that phosphate is unique; neither sulfuric nor nitric acids immobilize lead and cadmium, nor do their salts.

TABLE 8

Effectiveness of Various Acids and
Their Salts in Immobilization

| Addend | None | $H_3PO_4$ | H2SO4 | $HNO_3$ | $Na_2HPO_4$ | $Na_2SO_4$ | $NaNO_3$ |
|---|---|---|---|---|---|---|---|
| Concentration (meq/g residue) | | 4.3 | 4.3 | 4.3 | 3.5 | 3.5 | 3.5 |
| EP Toxicity Test | | | | | | | |
| Initial pH | 12.16 | 7.40 | 10.48 | 11.88 | 12.30 | 12.21 | 12.14 |

TABLE 8-continued

| Effectiveness of Various Acids and Their Salts in Immobilization | | | | | | | |
|---|---|---|---|---|---|---|---|
| Final pH | 5.38 | 5.05 | 5.01 | 5.18 | 5.18 | 5.12 | 5.21 |
| Extract mg/ml | | | | | | | |
| Pb | 11.8 | 0.23 | 4.7 | 6.6 | 0.24 | 14 | 8.9 |
| Cd | 1.27 | 0.45 | 1.2 | 1.39 | 0.33 | 0.93 | 0.82 |

EXAMPLE 10

To he ash-flue gas scrubber product mixture of the prior example was added 4.25% by weight phosphoric acid. This mixture was placed in a column and three volumes of water was percolated through the particulate mass to simulate landfill conditions. The mass was removed, air dried, and subjected to a particle size distribution analysis whose results appear in Table 9.

TABLE 9

Particle Size Distribution of Ash Before and After Immobilization by Phosphate

| | Percent of Total | |
|---|---|---|
| Particle Size, mm | Untreated Ash | Treated Ash |
| <0.074 | 3.9 | 3.7 |
| 0.074–0.42 | 8.2 | 8.9 |
| 0.42–2 | 23.6 | 21.3 |
| 2–9.5 | 64.3 | 66.1 |

These data show that the particulate nature of the mass remains virtually unaffected by the immobilization treatment of this invention.

EXAMPLE 11

The same mixture of fly ash and flue gas scrubber product as described in Example 8 was treated with 0.6% phosphorous as phosphate from insoluble $Ca_3(PO_4)_2$ and then subjected to the EPA leach test. The leachate had 19 ppm lead, showing that calcium phosphate is ineffective as a phosphate source in the immobilization of lead by our method.

What is claimed is:

1. A method of immobilizing lead and cadmium in a free flowing particulate dry solid residue which maintains its free flowing particulate nature after the immobilizing treatment, said dry solid residue comprising fly ash and mixtures of fly ash with bottom ash resulting from the incineration of municipal waste, comprising contacting the dry solid residue with at least one water soluble phosphate in an amount equivalent to about 1 to about 8% by weight of phosphoric acid based on the total residue in the presence of a free lime source selected from the group consisting of lime, hydrated lime, flue gas scrubber product, and combinations thereof, in an amount sufficient to furnish from about 1 to about 25 parts by weight calcium hydroxide per 5 parts by weight of fly ash whereby the leaching of cadmium and lead is reduced to a level no more than 1 ppm cadmium and 5 ppm lead as determined in an EPA test performed on the resulting dry treated residue.

2. The method of claim 1 where the dry solid residue contains from about 2 to about 25% by weight of fly ash.

3. The method of claim 1 where the dry solid residue contains from about 5 to about 20% by weight of fly ash.

4. The method of claim 1 where the dry solid residue is essentially fly ash.

5. The method of claim 1 where the free lime source is the flue gas scrubber product of a mass burning facility.

6. The method of claim 1 where the water soluble phosphate is selected from the group consisting of phosphoric acid, polyphosphoric acid, hypophosphoric acid, metaphosphoric acid, and salts thereof.

7. The method of claim 6 where the salts are alkali metal salts.

8. The method of claim 7 where the salt is trisodium phosphate, disodium hydrogen phosphate, sodium dihydrogen phosphate, tripotassium phosphate, dipotassium hydrogen phosphate, potassium dihydrogen phosphate, trilithium phosphate, dilithium hydrogen phosphate, lithium dihydrogen phosphate or mixtures thereof.

9. The method of claim 6 where the water soluble phosphate is phosporic acid.

10. A method of immobilizing lead and cadmium as a free flowing particulate mass in a free flowing dry particulate mass of a fly ash and bottom ash mixture where each said ash results from the incineration of municipal waste in a mass burning facility comprising contacting the dry ash mixture with at least one water soluble phosphate in an amount equivalent to about 1 to about 8 percent by weight of phosphoric acid based on the total ash mixture in the presence of a free lime source selected from the group consisting of lime, hydrated lime, flue gas scrubber products, and combinations thereof, in an amount sufficient to furnish from about 1 to about 25 parts by weight of calcium hydroxide per 5 parts by weight of fly ash whereby the leaching of cadmium and lead is reduced to a level no more than 1 ppm cadmium and 5 ppm lead as determined in an EPA test performed on the resulting treated ash mixture.

11. The method of claim 10 where the dry particulate ash mixture contains from about 2 to about 25% by weight of fly ash.

12. The method of claim 11 where the dry particulate ash mixture contains from about 5 to about 20% by weight of fly ash.

13. The method of claim 10 where the free lime source is the flue gas scrubber product of a mass burning facility.

14. The method of claim 10 where the water soluble phosphate is selected from the group consisting of phosphoric acid, polyphosphoric acid, hypophosphoric acid, metaphosphoric acid, and salts thereof.

15. The method of claim 14 where the salts are alkali metal salts.

16. The method of claim 15 where the salt is trisodium phosphate, disodium hydrogen phosphate, sodium dihydrogen phosphate, tripotassium phosphate, dipotassium hydrogen phosphate, potassium dihydrogen phosphate, trilithium phosphate, dilithium hydrogen phosphate, lithium dihydrogen phosphate or mixtures thereof.

17. The method of claim 14 where the water soluble phosphate is phosporic acid.

* * * * *

UNITED STATES PATENT AND TRADEMARK OFFICE
CERTIFICATE OF CORRECTION

PATENT NO. : 4,737,356

DATED : April 12, 1988

INVENTOR(S) : Mark J. O'Hara and Marion R. Surgi

It is certified that error appears in the above-identified patent and that said Letters Patent is hereby corrected as shown below:

Title page (cover page), in the first column, please delete:

"[*] Notice: The portion of the term of this patent subsequent to Feb. 9, 1999 has been disclaimed."

Signed and Sealed this

Third Day of September, 1991

*Attest:*

HARRY F. MANBECK, JR.

*Attesting Officer* *Commissioner of Patents and Trademarks*